United States Patent
Batley et al.

(10) Patent No.: US 11,579,879 B2
(45) Date of Patent: Feb. 14, 2023

(54) PROCESSING PIPELINE WITH FIRST AND SECOND PROCESSING MODES HAVING DIFFERENT PERFORMANCE OR ENERGY CONSUMPTION CHARACTERISTICS

(71) Applicant: ARM LIMITED, Cambridgeshire (GB)

(72) Inventors: Max John Batley, Cottenham (GB); Simon John Craske, Cambridgeshire (GB); Ian Michael Caulfield, Cambridgeshire (GB); Peter Richard Greenhalgh, Cambridgeshire (GB); Allan John Skillman, Kettering (GB); Antony John Penton, Little Canfield (GB)

(73) Assignee: ARM LIMITED, Cambridge (GB)

( * ) Notice: Subject to any disclaimer, the term of this patent is extended or adjusted under 35 U.S.C. 154(b) by 36 days.

(21) Appl. No.: 17/224,248

(22) Filed: Apr. 7, 2021

(65) Prior Publication Data

US 2021/0224071 A1    Jul. 22, 2021

Related U.S. Application Data

(63) Continuation of application No. 15/578,324, filed as application No. PCT/GB2016/050907 on Mar. 31, 2016, now abandoned.

(30) Foreign Application Priority Data

Jun. 5, 2015    (GB) ...................................... 1509737

(51) Int. Cl.
  *G06F 9/30*    (2018.01)
  *G06F 9/38*    (2018.01)
  (Continued)

(52) U.S. Cl.
  CPC ........ *G06F 9/30145* (2013.01); *G06F 1/3287* (2013.01); *G06F 1/3293* (2013.01);
  (Continued)

(58) Field of Classification Search
  CPC .. G06F 9/30145; G06F 1/3287; G06F 1/3293; G06F 1/3296; G06F 9/3836;
  (Continued)

(56) References Cited

U.S. PATENT DOCUMENTS 6,320,418 B1    11/2001    Fujii et al.
6,643,739 B2    11/2003    Van De Waerdt et al.
(Continued)

FOREIGN PATENT DOCUMENTS

CN    1459058    11/2003
CN    1667570    9/2005
(Continued)

OTHER PUBLICATIONS

Chaver et al.; Branch Prediction On Demand: an Energy-Efficient Solution; ACM; 2003 (Year: 2003).*
(Continued)

*Primary Examiner* — Corey S Faherty
(74) *Attorney, Agent, or Firm* — Nixon & Vanderhye, P.C.

(57) ABSTRACT

An apparatus 2 has a processing pipeline 4 supporting at least a first processing mode and a second processing mode with different energy consumption or performance characteristics. A storage structure 22, 30, 36, 50, 40, 64, 44 is accessible in both the first and second processing modes. When the second processing mode is selected, control circuitry 70 triggers a subset 102 of the entries of the storage structure to be placed in a power saving state.

14 Claims, 6 Drawing Sheets

(51) Int. Cl.
  *G06F 1/3287* (2019.01)
  *G06F 1/3293* (2019.01)
  *G06F 1/3296* (2019.01)
  *G06F 12/1027* (2016.01)

(52) U.S. Cl.
  CPC ............ *G06F 1/3296* (2013.01); *G06F 9/384* (2013.01); *G06F 9/3836* (2013.01); *G06F 9/3844* (2013.01); *G06F 9/3867* (2013.01); *G06F 9/3885* (2013.01); *G06F 9/3806* (2013.01); *G06F 12/1027* (2013.01)

(58) Field of Classification Search
  CPC ...... G06F 9/384; G06F 9/3844; G06F 9/3867; G06F 9/3885; G06F 9/3806; G06F 12/1027; G06F 1/3203; G06F 1/3243; Y02D 10/00
  See application file for complete search history.

(56) References Cited

U.S. PATENT DOCUMENTS

| | | | |
|---|---|---|---|
| 7,539,879 | B2 | 5/2009 | Terechko |
| 7,676,663 | B2 | 3/2010 | Prasky et al. |
| 7,962,770 | B2 | 6/2011 | Capps, Jr. et al. |
| 8,181,054 | B2 | 5/2012 | Terechko |
| 9,870,226 | B2 | 1/2018 | Padmanabha et al. |
| 2002/0133672 | A1 | 9/2002 | Van De Waerdt et al. |
| 2004/0098540 | A1 | 5/2004 | Itoh et al. |
| 2005/0204120 | A1* | 9/2005 | Prasky .................. G06F 9/325 712/238 |
| 2006/0282826 | A1 | 12/2006 | Dockser |
| 2007/0083785 | A1 | 4/2007 | Sutardja |
| 2008/0169841 | A1 | 7/2008 | Gemmeke et al. |
| 2009/0119477 | A1* | 5/2009 | Plondke .............. G06F 12/1027 711/E12.002 |
| 2009/0164812 | A1 | 6/2009 | Capps, Jr. et al. |
| 2009/0292892 | A1 | 11/2009 | Abernathy et al. |
| 2014/0281402 | A1 | 9/2014 | Comparan et al. |
| 2015/0127928 | A1 | 5/2015 | Burger et al. |
| 2015/0154021 | A1 | 6/2015 | Padmanabha |
| 2016/0004534 | A1 | 1/2016 | Padmanabha et al. |
| 2018/0150297 | A1 | 5/2018 | Batley et al. |

FOREIGN PATENT DOCUMENTS

| | | |
|---|---|---|
| CN | 101464721 | 6/2009 |
| CN | 103914346 | 7/2014 |
| CN | 105242963 | 1/2016 |
| GB | 2 317 975 | 4/1998 |

OTHER PUBLICATIONS

International Search Report and Written Opinion of the ISA of PCT/GB2016/050907, dated Jun. 20, 2016, 10 pages.
Combined Search and Examination Report for GB 1509737.1, dated Nov. 30, 2015, 5 pages.
Office Action dated Jan. 14, 2021, issued in CN Application No. 201680030854.1 (12 pages) with English Translation (31 pages).
Ayala, et al. "Energy Aware Register File Implementation through Instruction Predecode" Proceedings of the Application-Specific Systems, Architectures and Processors, Jun. 25, 2003 (11 pages).
Examination Report issued in GB Application No. 1509737.1 dated Aug. 14, 2020, 3 pages.
Ayala et al.; Reducing Register File Energy Consumption using Compiler Support; IEEE Workshop on Application Specific Processors, 2002, 6 pages.
Office Action issued in Korean Application No. 10-2017-7036367, dated Jun. 21, 2022 with English translation (10 pages).

\* cited by examiner 22, 30, 36, 50,
64, 40, 44

PROCESSING PIPELINE WITH FIRST AND SECOND PROCESSING MODES HAVING DIFFERENT PERFORMANCE OR ENERGY CONSUMPTION CHARACTERISTICS

CROSS REFERENCE TO RELATED APPLICATIONS

This application is a Continuation Application of U.S. application Ser. No. 15/578,324, filed on Nov. 30, 2017, which is the U.S. national phase of International Application No. PCT/GB2016/050907 filed Mar. 31, 2016, which designated the U.S. and claims priority to GB Patent Application No. 1509737.1 filed Jun. 5, 2015, the entire contents of each of which are hereby incorporated by reference.

The present technique relates to the field of data processing.

A processing pipeline may have features such as out-of-order execution, speculative execution or parallel issue/execution which can enable greater throughput of instructions. However, this may require more complex circuits which may consume more energy than a simpler pipeline with resources supporting a smaller throughput of instructions. Therefore, when designing a pipeline, there may be a trade-off between performance and energy consumption.

At least some examples provide an apparatus comprising:
a processing pipeline to process instructions, the processing pipeline having at least a first processing mode and a second processing mode with different performance or energy consumption characteristics;
a storage structure accessible to the processing pipeline in both the first processing mode and the second processing mode, the storage structure comprising a plurality of entries; and
control circuitry to select one of the first processing mode and the second processing mode of the processing pipeline, and to trigger a subset of the entries of the storage structure to be placed in a power saving state when the second processing mode is selected.

At least some examples provide an apparatus comprising:
means for pipelined processing of instructions, having at least a first processing mode and a second processing mode with different performance or energy consumption characteristics;
means for storing information accessible to the means for pipelined processing in both the first processing mode and the second processing mode, the means for storing information comprising a plurality of entries; and
means for selecting one of the first processing mode and the second processing mode of the means for pipelined processing, and triggering a subset of the entries of the means for storing to be placed in a power saving state when the second processing mode is selected.

At least some examples provide a method comprising:
selecting one of at least a first processing mode and a second processing mode of a processing pipeline for processing instructions, the first processing mode and the second processing mode having different performance or energy consumption characteristics, the processing pipeline having access to a storage structure in both the first processing mode and the second processing mode, the storage structure having a plurality of entries; and
when the second processing mode is selected, placing a subset of the entries of the storage structure in a power saving state.

Further aspects, features and advantages of the present technique will be apparent from the following description of examples, which is to be read in conjunction with the accompanying drawings, in which:

FIG. 1 schematically illustrates an example of a data processing apparatus having a pipeline supporting processing modes with different performance or energy consumption characteristics;

Figure 1:
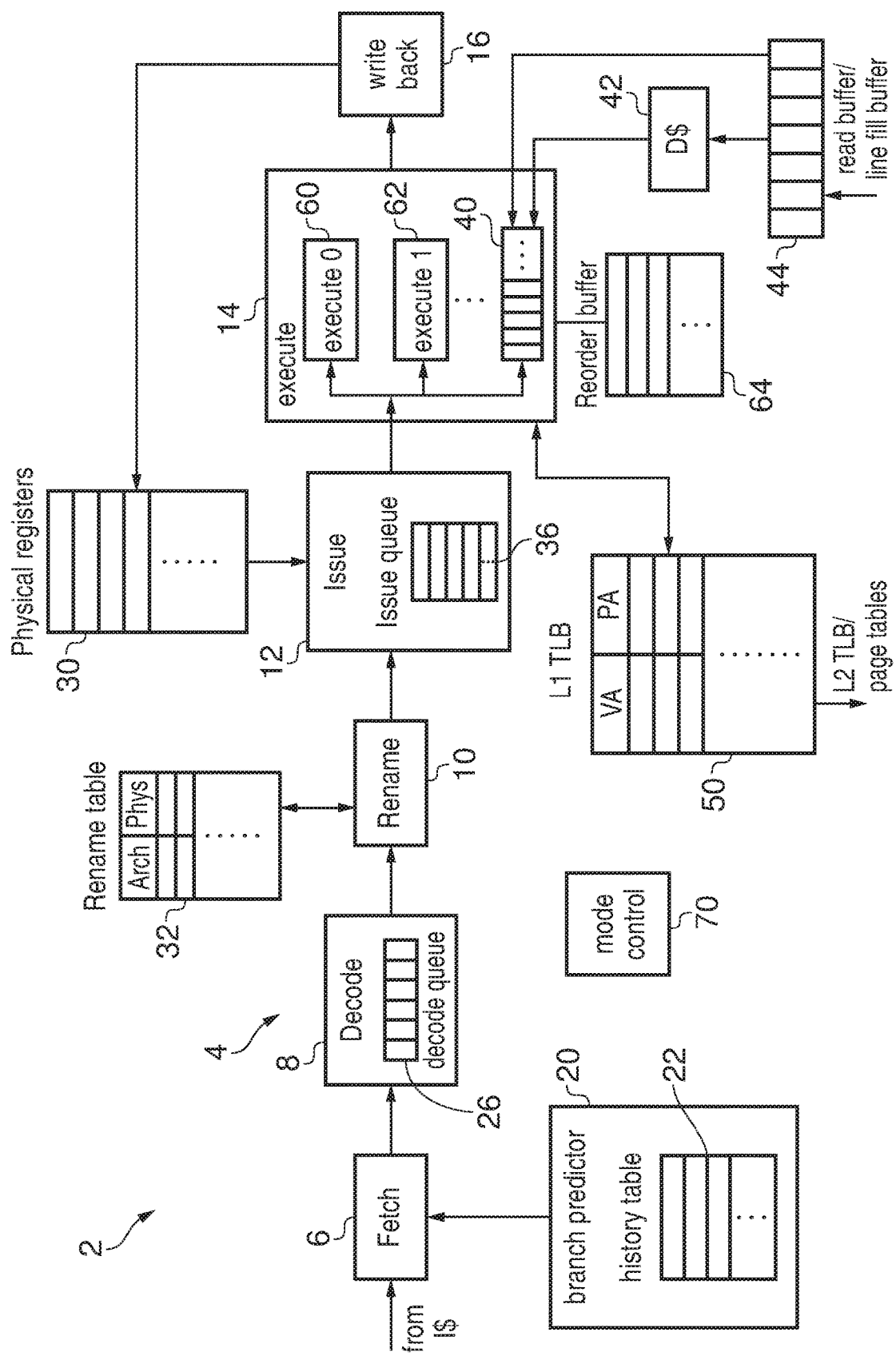

Some examples of the present technique are discussed below.

A processing pipeline may have at least two processing modes with different performance or energy consumption characteristics. For example, there could be multiple execution units available for executing a given set of instructions, with the different processing modes using different execution units to execute the instructions. The processing modes could differ in terms of the number of instructions which can be processed in parallel, the maximum clock frequency supported, or the extent to which instructions may be executed out of order, for example. Unlike implementations which provide two entirely separate processor cores, by providing a single pipeline with two or more processing modes with different performance or energy consumption characteristics, the overhead of switching between the modes can be reduced and so it is possible to switch modes more frequently so that it becomes feasible to schedule shorter sequences of instructions in one mode or other to achieve higher performance gains or energy savings.

In a processing pipeline having two or more processing modes with different performance or energy consumption characteristics, there may be at least one shared storage structure which is accessible to the processing pipeline in two or more of the modes. To support a first processing mode, it may be desired to provide a given number of entries in the storage structures. However, for a second mode with lower performance requirements, not all of the entries may be needed and to save energy the size of the storage structure can effectively be reduced by placing a subset of the entries in a power saving state. Hence, by shrinking the effective size of the storage structure in the second processing mode compared to the first processing mode, the energy cost of operating the second processing mode can be reduced, while still supporting the increased performance associated with the first mode, and without the added circuit area and leakage cost of providing duplicate storage structures of different sizes. The full cost of maintaining the larger storage structure required for one mode need not be incurred when using another mode, to provide a better balance between performance and energy efficiency.

In general, the first processing mode may provide a greater maximum throughput of instructions than the second processing mode. This does not necessarily mean that instructions will always be processed with greater throughput in the first processing mode than in the second processing mode. Some sequences of instructions may exhibit a larger performance difference between the different processing modes than others. For example if a code sequence requires many memory accesses followed by other operations which depend on the memory access, then the performance when executing the code sequence may be largely dependent on the memory access latency rather than the way in which the first or second processing modes execute the instructions, and so there may be little difference in performance regardless of which mode is used. In this case, it may be more efficient to process this piece of code with the second processing mode which may provide lower energy consumption. On the other hand, for code sequences which include a large number of independent calculations with fewer accesses to memory, there may be a greater performance difference between the two modes and so the first processing mode may be selected to improve performance. Hence, the different processing modes of the pipeline enable a better balance in performance and energy consumption compared to a pipeline with a fixed mode of processing, since a mode appropriate to the type of code being executed can be selected. Nevertheless, even if the first processing mode may not always achieve a greater throughput when executing a set of instructions, the maximum achievable throughput may be greater for the first processing mode than the second processing mode.

In some examples, the difference in throughput may be solely due to the resizing of the storage structure in the different modes. For example, in a mode using a larger register file or a deeper issue queue or reorder buffer, a greater throughput of the instructions may be possible than when the corresponding structures are smaller, since it is less likely that processing is stalled due to insufficient space in the storage structure. However, in many cases the first and second processing modes may differ in at least one other way in addition to the size of the active portion of the storage structure. For example the first processing mode may support a greater degree of out-of-order execution than the second processing mode, support operating at a higher clock frequency, or could support processing a greater number of instructions in parallel than the second processing mode.

The resizing of the effective portion of the storage structure may be carried out in different ways when transitioning between the first and second processing modes. For some structures it is possible on switching from the first mode to the second mode to disable further allocation of information to the subset of entries and also prevent access to existing information in those entries. For example, the subset of entries could simply be switched to the power saving state to disable both new allocations and hits in existing entries. This approach may be suitable for storage structures which merely cache a subset of data stored elsewhere so that the data in these entries could be invalidated without loss of state.

However, for other kinds of structures the data in the subset of entries could still be dirty or there may be a need to continue accessing data for a time after the switch to the second processing mode. Therefore, it is possible to transition between the modes with a more gradual switching scheme. At first, the control circuitry may disable further allocation of information to the subset of entries, but continue to allow the processing pipeline to access information within at least some of the subset of entries for a period after disabling further allocations to those entries. Hence, while new data cannot be allocated to these entries, existing data from within the entries may still be accessed for some time. This can allow time for dirty data to be written back to a different location or for active data to be drained from the subset of entries before they are powered down.

Later, the control circuitry may trigger one of the subset of entries to be placed in a power saving state in response to an indication that the processing pipeline no longer requires that entry. This indication could be in various forms. In some cases entries may have associated valid indication indicating whether the data in that entry is valid and the control circuitry could wait for the data in that entry to become invalid before powering down the entry. Also the control circuitry could track completion of instructions which require particular entries of the storage structure and trigger an entry to be placed in the power saving state when the corresponding instruction has completed to the point at which the entry is no longer required. In other examples, there may be no individual tracking of which instructions require which entry, and instead the control circuitry may simply wait for a general indication that there are no instructions pending which are older than the point when the switch of processing mode was initiated, and then power down each of the subset of entries at this point. Therefore, there are a number of ways of controlling when the entries are powered down.

In parallel with monitoring whether the subset of entries can be placed in the power saving state, processing of instructions can continue in the second processing mode using the other entries which are not being powered down, so that it is not necessary to wait for all the data to be drained from the subset of entries before starting processing in the new processing mode. The monitoring of whether the entries in the subset are still required can continue in the background while normal execution continues using the other entries, so that there is relatively little performance impact (other than the reduced size of the storage structure itself) caused by the switch process.

On the other hand, on switching the processing pipeline from the second processing mode to the first processing mode, the control circuitry may power up the subset of entries and enable further allocation of information to those entries so that subsequent processing can begin using the newly active subset of entries when processing continues in the first processing mode.

Hence, on switching from the first processing mode to the second processing mode, the effective size of the storage structure may be reduced, and on switching back to the first processing mode, the effective size of the storage structure may be increased. In this context, "on switching" does not imply that the change of size has to occur at the exact point at which processing switches between modes. The change of size could occur before or after the switch point (e.g. as discussed above the effective size could be reduced gradually by a background process running in parallel with continued processing in the second processing mode).

The technique discussed above could be applied to a range of storage structures within the pipeline. For example, the storage structures may be for storing architectural state data for the processing pipeline, indications of pending instructions being processed by the processing pipeline or control data for controlling how instructions are processed by the pipeline. For example, the storage structure could be:
 a translation lookaside buffer (TLB) for storing address
    translation data a branch prediction table used by a branch predictor for predicting outcomes of branch instructions, an instruction queue to queue pending instructions to be processed by the pipeline (for example, the instruction queue could be a decode queue for queuing instructions awaiting decoding, or an issue queue for queuing instructions awaiting issue for execution), a reorder buffer for tracking completion of execution of instructions by the processing pipeline, a load/store queue for queueing pending loads or store operations for accessing data in a cache or memory, a buffer to store data which has been read from a storage device (such as a higher level cache or memory) prior to the read data being accessed by the processing pipeline itself or stored in a lower level cache, or a block of registers which store data values or operands accessible to the processing pipeline in response to the instructions.

Hence, any one or more of these structures may be resized by powering down a subset of the entries of the storage structure when in the second processing mode. The size of the subset of entries may be determined up front by a system designer, based on modelling or benchmarking, depending on the expected performance needs and energy savings desired for each processing mode.

Where the storage structure comprises physical registers, the transition between modes may include a register mapping step. The apparatus may have register renaming circuitry for mapping architectural register specifiers specified by instructions to corresponding physical registers at least when the processing pipeline is in the first processing mode (and in some cases also in the second processing mode). On switching from the first processing mode the second processing mode, the register renaming circuitry may disable further allocation of a subset of physical registers to architectural register specifiers, so that the subset of registers can be powered down. However, at this point some of the subset of registers may currently be mapped to an architectural register and so simply powering down the register may lead to loss of architectural state. Therefore, on switching the processing pipeline from the first processing mode to the second processing mode, the register renaming circuitry may remap any architectural register specifiers which are currently mapped to the subset of physical registers to alternate physical registers which are outside the subset of physical registers. For example, a rename table may identify current mappings for each architectural register specifier, and the rename circuitry may walk through the remap table to map each of the architectural registers to a different physical register if they are currently mapped to a register within the subset.

The remapping of registers can be implemented in different ways. There could be some instructions to be processed following the switch of processing modes which will overwrite the data associated with a given architectural register specifier, so that the architectural state will then become the result of that instruction rather than the previous value associated with the architectural register specifier. In this case, there may not be a need to perform any special operation to remap the architectural register specifier from one of the subset of physical registers to an alternate physical register, since instead the register renaming circuitry can simply rename the architectural register specifier to an alternate physical registers in the usual way when a subsequent instruction which overwrites that architectural register is encountered.

However, it is not guaranteed that all architectural registers will be written to by a subsequent instruction, or at least it may take some time before all architectural registers have been written to. If it is necessary to wait a long time before all the architectural registers have been remapped to physical registers outside the subset to be powered down, then this can delay the power savings achieved by powering down those registers, which may at least partially negate the advantage of switching to the second processing mode in the first place. Therefore, to speed things up the register renaming circuitry could also remap a given architectural register specifier to an alternate physical register by triggering an additional instruction to be processed by the pipeline to control the pipeline to move a data value from one of the subset of the physical registers to an alternate physical register outside the subset, and update the register renaming table to reflect the new mapping of the architectural register specifier to the alternate physical register. Some systems could perform all of the remapping operations by injecting additional instructions.

Other implementations could combine both of these approaches, if possible using existing instructions to remap those architectural register specifiers currently mapped to one of the subset of physical registers, but injecting some additional instructions if an instruction overwriting a given architectural register specifier is not encountered within a certain time. Regardless of how the remapping is performed, once each of the architectural register specifiers are mapped to registers outside the subset, then the subset of physical registers can be placed in a power saving state.

On switching to the second processing mode, if any architectural register specifiers are already mapped to a physical register outside the subset to be powered down, then one option may be to leave those register mappings as they are and to restrict the remapping to those architectural register specifiers which are currently mapped to registers within the subset. However, this may result in a relatively random mapping of architectural register specifiers to physical registers following the switch of modes, and even if register renaming would not normally be required for processing in the second processing mode, the rename table may still need to be active during the second processing mode to identify which physical registers correspond to architectural register specifiers.

A more energy efficient approach may be to map each architectural register specifier to a predetermined physical register on switching to the second processing mode. Hence, even if at the time of switching modes one of the architectural register specifiers is already mapped to a physical register outside the subset at the point of the switch, that architectural register may still be remapped to a different predetermined physical register. Once all architectural registers have a known mapping, then this may allow the rename table to be placed in the power saving state, in addition to the subset of physical registers themselves, since the architectural registers now have a fixed one-to-one mapping with the physical registers and so the rename table is not required. This can allow for greater energy savings both in the rename table, and also in the control logic for powering down the subset of registers (because the logic may merely power down a fixed set of registers, rather than needing to read the rename table to determine which registers should be powered down).

FIG. 1 schematically illustrates an example of a data processing apparatus 2 having a processing pipeline 4 for processing instructions. The pipeline 4 includes a number of stages including a fetch stage 6, a decode stage 8, a rename stage 10, an issue stage 12, an execute stage 14 and a write back stage 16. Instructions move through the pipeline from stage to stage and some instructions may be at one stage at the pipeline while other instructions are pending at another stage. It will be appreciated that this is just an example of a possible pipeline configuration and other examples may have different stage or combinations of stages as required.

The fetch stage 6 fetches instructions from an instruction cache. A branch predictor 20 is provided for predicting the outcomes of branch instructions. The branch predictor 20 may have a branch history table 22 for storing prediction data used to make the branch predications. For example the history table may be updated in response to resolved branches so that when a similar branch is encountered later then a prediction can be made based on past history for that branch or other similar branches. Any known branch prediction scheme can be used. When a branch is predicted taken then the fetch stage 6 may start fetching instructions at the branch target address and subsequent addresses, while when a branch is predicted not taken then the fetch stage 6 may fetch instructions at addresses which are sequential to the address of the branch instruction.

The fetched instructions are passed to a decode stage 8 which decodes the instructions to generate decoded instructions which may provide control information for triggering the execute stage 14 to perform the corresponding processing operation.

The decode stage 8 may have a decode queue 26 for queuing instructions to be decoded. For some instructions fetched by the fetch stage 6, the decode stage 8 may map the instruction to more than one decoded instruction so that the "instructions" seen by later stages of the pipeline may be in a different form to the instructions fetched from the cache 20. For example, a single complex instruction may be broken down into individual micro-operations which each correspond to one step in the processing operation to be performed in response to the complex instruction. Therefore, references to "instructions" in this application should be interpreted as including micro-operations.

The decoded instructions are passed to a register rename stage 10 for mapping architectural register specifiers specified by the instructions to physical register specifiers identifying corresponding physical registers 30 to be accessed in response to the instructions. For example the physical register file 30 may include a greater number of registers than can be specified as architectural registers in the instruction set encoding. Register renaming can allow hazards to be resolved by mapping the same architectural register specifier in two different instructions to different physical registers 30. Any known register renaming technique can be used. The rename stage 10 may have a register rename table 32 for tracking the current mappings between architectural register specifiers and physical registers 30.

The issue stage 12 comprises an issue queue 36 for queueing instructions awaiting issue for execution. For example instructions may remain in the issue queue 36 until the operands required for executing the instruction are available following the execution of earlier instructions. In some examples, if an instruction requires a physical register 30 to be read, then the data may be read from that register while the instruction is pending in the issue queue 36 and stored alongside the instruction in the issue queue 36. Alternatively, register reads could take place in the execute stage 14.

The execute stage 14 executes instructions which have been issued by the issue stage 12, to carry out various data processing operations in response to the instructions, such as arithmetic or logical operations, or load/store operations to a data cache 42 or a further level cache or memory not shown in FIG. 1. The execute unit 14 may have a number of execution units 60, 62, 40, including a load store unit 40 for queuing a number of pending load/store operations. A read buffer 44 may be provided for buffering data which has been loaded from a further level cache or memory and is waiting to be allocated in the data cache 42 or read by the load/store unit 40. For example the read buffer 44 can allow the load store unit 40 to read data before it has actually been stored to the data cache 42. The pipeline also has a translation lookaside buffer 50 (TLB) which includes a number of TLB entries for translating virtual addresses specified by instructions to physical addresses identifying data within a cache or memory. Each entry may correspond to a given page of virtual addresses and specify how to translate those addresses into corresponding physical addresses. The TLB entry may also specify access permissions or other information for the corresponding page. When a load/store operation is received by the load/store queue 40, the load/store queue 40 may pass the corresponding virtual address to the TLB 50. If the TLB 50 includes an entry for the corresponding page, it may return the corresponding physical address if access is permitted to that page, or signal an error if access is not permitted. If the TLB 50 does not store an entry for the page including the requested virtual address, it can fetch the TLB entry from a further level TLB or page tables in memory.

The write back stage 16 writes results of instructions executed by the execute stage 14 to the physical register file 30.

The processing pipeline 4 supports two or more different processing modes with different energy or power consumption characteristics. For example the execute stage 14 may have different execute units 60, 62 which may execute substantially the same kinds of instructions but with a different level of performance or energy efficiency.

For example a first execute unit 60 may support out-of-order processing so that it may execute instructions from the issue queue 36 in a different order to the order in which those instructions were fetched from the instruction cache by the fetch stage 6. This can achieve higher performance because while one instruction is stalled (e.g. while awaiting completion of a load instruction in the load/store unit 40) a later instruction may still be able to proceed. However, out-of-order execution may also incur a greater energy cost because additional resources may be required to track the completion of the instructions. For example a reorder buffer 64 may be provided which monitors completion of instructions and retires instructions once earlier instructions have completed. The second execute unit 62 may provide in-order execution or out-of-order execution supporting less reordering of instructions.

In another example, the first execute unit 60 may be able to support processing of a greater number of instructions in parallel than the second execute unit 62.

Also, the first execution unit 60 may be able to perform a greater amount of speculative execution of instructions than the second processing unit 62, so that if the speculation is successful then performance can be improved because instructions can be executed before it is known for sure whether those instructions will execute correctly, eliminating the delay of only initiating the instruction after the condition required for execution of the instruction has been determined. However, again this may require additional resources for tracking speculative execution and rewinding state if an instruction is mis-speculated.

In some cases, the register rename stage 10 may be used for the first processing mode but not the second processing mode.

Hence there may be a number of differences in the execute stage 14 which may support different processing modes with different energy consumption or performance characteristics. There may also be different techniques used in other stages of the pipeline depending on which processing mode is selected. Hence, in general the pipeline 4 may have two or more processing modes, with at least one of the processing modes supporting a greater maximum throughput of instructions (but with a greater energy consumption) than another mode.

Mode control circuitry 70 is provided for controlling which mode the pipeline operates in. For example the mode control circuitry 70 may monitor various performance metrics during execution of instructions and use those performance metrics to determine whether it is preferable to continue processing in the first mode or the second mode. For example, if performance is relatively low even when a set of instructions is executed on the first execute unit 60 then this may indicate that these instructions are not suited to high performance execution and may be more efficiently executed on the second execute unit 62 which may consume less power.

For ease of explanation, the following examples discuss a "big" processing mode and a "little" processing mode. The big processing mode corresponds to a first processing mode which supports a greater maximum throughput of instructions than the little processing mode, and the little processing mode support corresponds to a second processing mode which provides reduced energy consumption compared to the big processing mode. It will be appreciated that the terms "big" and "little" are relative to each other and do not imply any particular absolute size or level of complexity.

As shown in FIG. 1, the pipeline 4 includes a number of pipeline data structures which include a number of entries for storing various data such as architectural state data (e.g. the physical registers 30), indications of pending instructions (e.g. the decode queue 26, the issue queue 36, load store queue 40 or reorder buffer 64), control data for influencing how instructions pending in the pipeline are processed (e.g. the branch history table 22, or the TLB 50), or fetched data to be read by the pipeline (e.g. the read buffer 44). In the big processing mode, a relatively large number of entries may be desirable to support a higher level of performance. For example, a larger branch history table 22 may increase the likelihood of predictions being correct which may improve the throughput of instructions through the fetch stage 6, a larger issue queue 36 or reorder buffer 64 may allow for greater reordering of instructions when out-of-order execution is supported and so this may enable higher performance, and a larger level-1 (L1) TLB 50 may allow quicker access to address translations because fewer address requests miss in the L1 TLB requiring a fetch of a TLB entry from a level 2 (L2) TLB. Similarly, increasing the size of other structures may also improve performance. However, using a fixed size structure would then increase energy consumption during the little processing mode. On the other hand, a smaller structure can reduce energy consumption but limit performance.

To avoid having to compromise on the size of the structure, each of these structures 22, 26, 30, 50, 36, 40, 64, 44 may be resized depending on the current mode of the pipeline 4, so that the active size of the storage structure may be different in the big processing mode compared to the little processing mode. A larger structure may be used in the big processing mode, but a subset of the entries may be placed in a power saving state to save energy when using the little processing mode. This enables a better balance between performance and energy savings.

Figure 2:
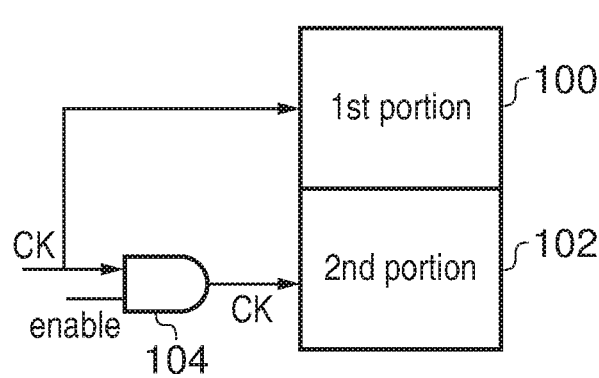
FIGS. 2 to 4 illustrate different examples of placing a subset of entries of a storage structure of the pipeline in a power saving state.
Figure 3:
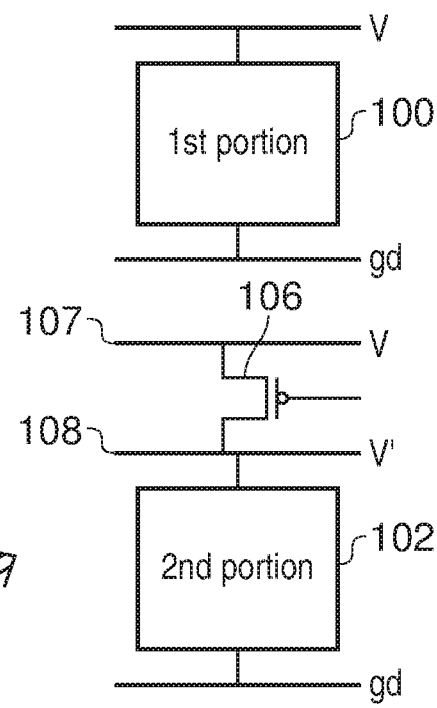
Figure 4:
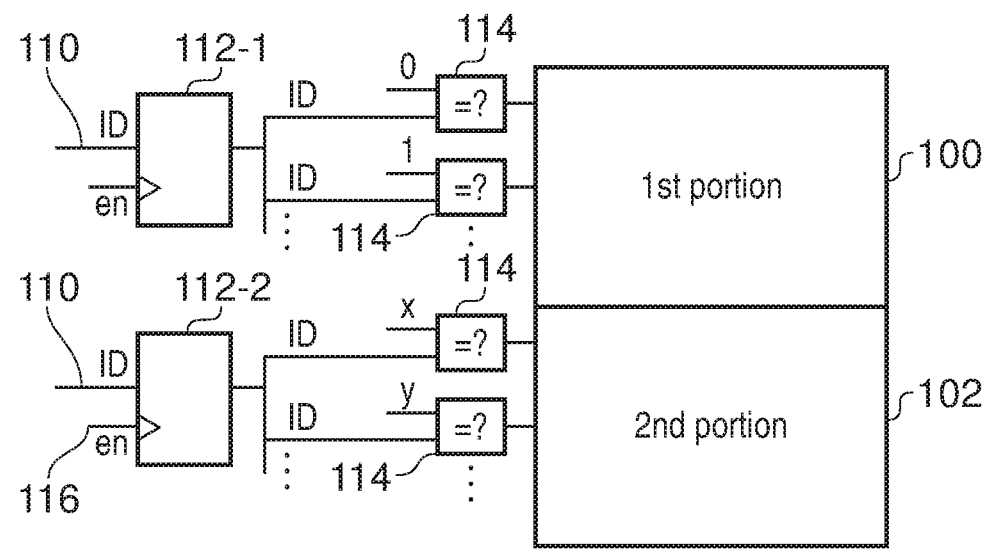

For example, FIGS. 2 to 4 show different techniques for placing a portion of storage structure in a power saving state. The storage structures shown in these Figures could be any of the examples 22, 26, 30, 36, 50, 64, 40, 44 discussed above. For each structure there may be a first portion 100 comprising entries which are to remain active regardless of which of the big and little processing modes are selected, and a second portion 102 comprising entries which are placed in a power saving state when the second processing mode is selected.

FIG. 2 shows a first example in which clock gating is used to place the second portion 102 in a power saving state. For example, a clock signal supplied to the second portion 102 of the storage structure may be prevented from toggling by deasserting an enable signal supplied to an AND gate 104. Meanwhile the clock signal to the first portion 100 may still toggle. By preventing toggling of the clock signal, this can reduce dynamic leakage in the second portion 102 of the storage structure and prevent data being allocated to the second portion 102 and accessed in the second portion 102 by the pipeline 4.

FIG. 3 shows a second example in which power gating may be used to place the second portion 102 in a power saving state. For example, at least one power gating transistor 106 may be provided between a voltage source 107 and the effective voltage supply 108 to the second portion 102 of the storage structure. This could be a header transistor 106 as shown in the example of FIG. 3 which is provided to selectively cut off the supply voltage for the second portion 102 or in other examples could be a footer transistor for cutting off the ground supply. Any known power gating scheme can be used. Meanwhile the first portion 100 of the storage structure may remain active even when the second portion 102 is powered down.

FIG. 4 shows another example in which data gating can be used to reduce power consumption in the second portion. In order to access a particular entry of the storage structure, an entry identifier 110 may be provided by the pipeline 4. For example, the entry identifier 110 could be a physical register specifier for selecting one of the physical registers 30, part of a virtual address for indexing into the TLB 50, etc. The identifier 110 may be captured by a latch 112 and then compared with corresponding identifiers for each entry of the storage structure by a series of comparators 114. The values compared with the ID 110 may simply be fixed index values associated with each entry, or may depend on a portion of the information stored in the corresponding entry (e.g. the virtual page address in the case of the TLB). Regardless of the particular nature of the comparison, the comparators 114 may consume dynamic leakage as their outputs toggle in response to different values of the ID 110 supplied to the comparator. Therefore, to save power the outputs of the comparators 114 associated with the entries in the second portion 102 may be prevented from toggling, for example by deasserting the enable signal 116 of the latch 112-2 which supplies the entry identifier 110 to the comparators 114 as shown in FIG. 4 (while the latch 112-1 may remain enabled to supply the entry identifier 110 to the comparators 114 of entries in the first portion 100). Alternatively, an AND gate could be provided downstream from the comparators 114 of the second portion 102 with an enable signal deasserted (in a similar way to the clock gating shown in FIG. 2) to prevent toggling of the comparator 114 output. In this way, the second portion 102 of the storage structure can be rendered inaccessible by preventing the comparators 114 for those entries generating a hit signal which would result in that entry being selected for reading a data value from the storage structure.

In other examples, a combination of the clock gating, power gating and data gating technique shown in FIGS. 2 to 4 may be used so that two or more of these techniques can be used in combination to achieve further energy savings.

The relative sizes of the first and second portions 100, 102 of each storage structure may be selected depending on design requirements for a particular implementation. For some storage structures a greater portion of the storage structure may be powered down when in the little processing mode while other structures may only have a smaller reduction in the effective size of the storage structure. For example, for a level 1 TLB 50 there might be 32 to 64 entries in the big processing mode but there may only need to be 8 to 16 entries in the little processing mode, and so unused entries could be powered down. The size of the portion to be turned off may be determined upfront by a system designer based on modelling or benchmarking and become a parameter of the design. The subset of entries to be powered down may be a strict subset of the total number of entries, so that there is at least one other entry which remains active during both the big and little processing modes.

Figure 5:
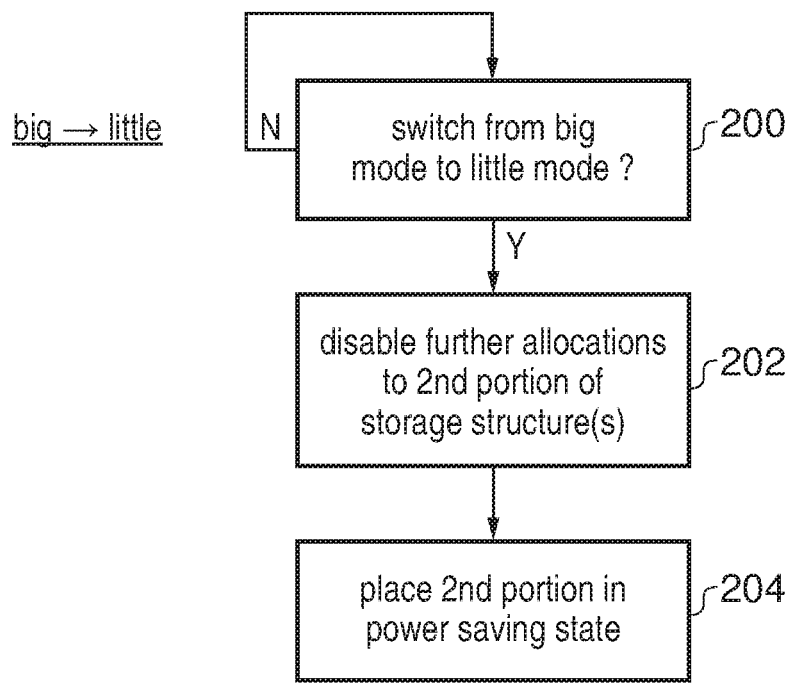
FIG. 5 is a flow diagram showing a transition from a first processing mode to a second processing mode.

FIG. 5 is a flow diagram showing a first example of a method of switching from the big processing mode to the little processing mode. This approach may be suitable at least for structures such as the L1 TLB 50 for which simply turning off entries will not lead to loss of state or instructions being prevented from executing. This is the case for the L1 TLB 50 because it merely caches a subset of entries from the L2 TLB or page tables, and so while eliminating entries may affect performance because the eliminated entries would need to be fetched from the L2 TLB or page table, it would not affect the results generated in response to instructions being processed by the pipeline. In FIG. 5, at step 200, the mode control circuitry 17 determines whether processing is to switch from the big processing mode to the little processing mode. If not then processing continues in the big processing mode. If processing is to switch to the little processing mode, then at step 202 the mode control circuitry 70 disables further allocations of data to entries within the second portion 102 of the storage structure, and at step 204 the control circuitry 70 places the second portion 102 of the storage structure in the power saving state. In some cases steps 202 and 204 may be a single step since the disabling of allocations and placing of entries in the power saving state may occur at substantially the same time, by applying clock gating, data gating or power gating for example as discussed above. Processing may then continue in the little processing mode with the mode control circuitry 70 also controlling any other changes required within the pipeline for transitioning between the modes, such as issuing instructions to a different execute unit 62. Processing continues with the storage structure 50 effectively reduced in size.

Figure 6:
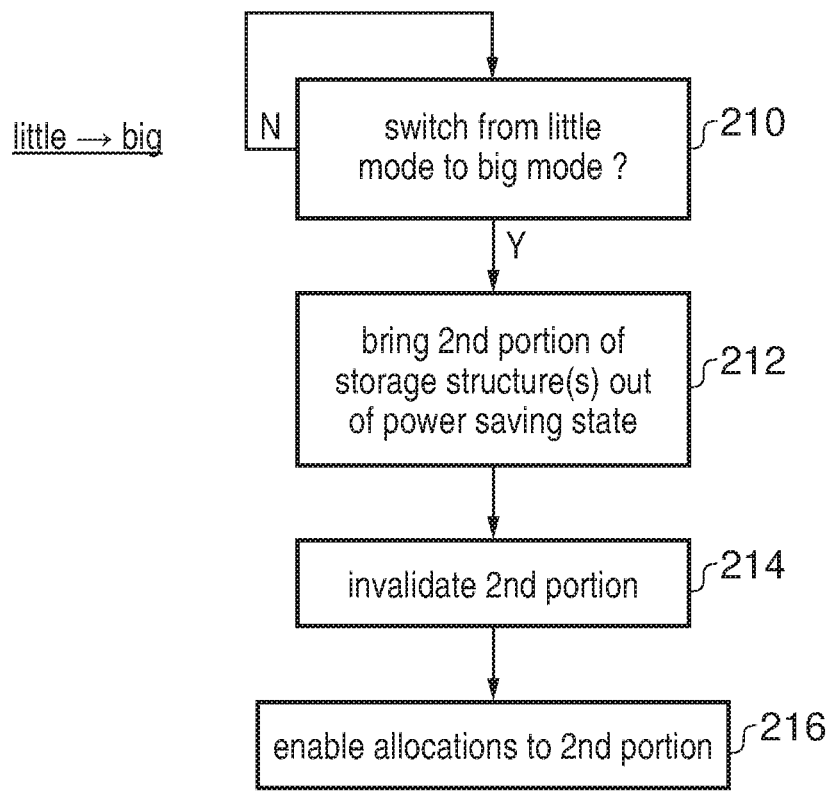
FIG. 6 shows a transition from a second processing mode to the first processing mode.

FIG. 6 shows a method of transitioning back from the little processing mode to the big processing mode. At step 210 the control circuitry 70 determines whether processing needs to be switched from little to big processing mode. If not then processing remains in the little processing mode. If a switch to the big processing mode is desired, then at step 212 the mode control circuitry 70 triggers the second portion 102 of the storage structure to be brought out of the power saving state, for example by re-enabling the clock supply, voltage supply or comparators as shown in FIGS. 2 to 4. At step 214 the data in the second portion 102 of the storage structure may be invalidated to ensure that out of date data does not affect processing of later instructions, since the data in the second portion 102 may have been corrupted during the power saving state or may be out of date because it relates to processing performed some time earlier when the big processing mode was previously used. At step 216, the control circuitry 70 re-enables allocations of new data to the second portion 102 of the storage structure, so that the big processing mode can enjoy the benefits of the full size of the storage structure.

For other types of storage structure, a more gradual scheme for switching from the big to the little processing mode may be used. This can be used for structures for which simply turning off some entries could lead to loss of architectural state or loss of instructions from the pipeline, which could affect the validity of results of other instructions. To reduce the latency of a switch, a scheme can be used where first further allocations of data to the second portion of the structure are disabled while still allowing entries to be hit on. A small dedicated piece of hardware within the mode control circuitry 70 or some control logic associated with the storage structure itself may then run to invalidate unused entries once they are no longer required. This can run in the background while normal execution continues underneath so that there is little performance impact associated with the switch process, beyond the reduced size of the storage structure.

Figure 7:
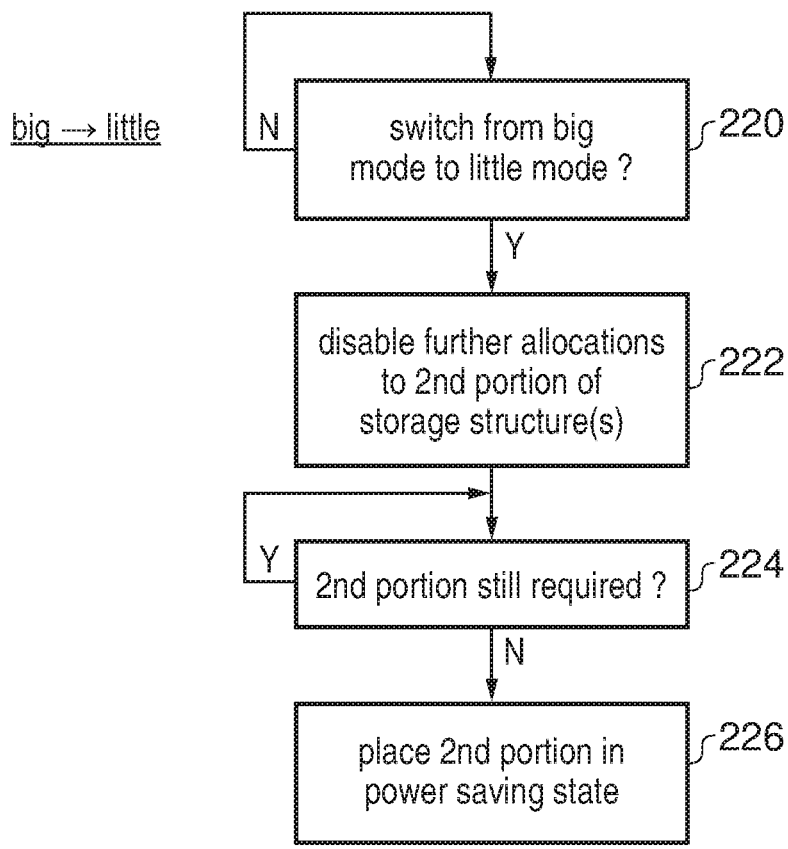
FIG. 7 shows a second example of transitioning from the first processing mode to the second processing mode.

FIG. 7 shows an example of such a switching process. At step 220 of FIG. 7 the mode control circuitry 70 determines whether there is to be a switch from the big processing mode to the little processing mode. For example this can be based on performance metrics monitored during processing. If there is to be a switch then at step 222 the control circuitry 70 controls the storage structure to disable further allocations to the second portion of the storage structure while still permitting continued access to the data. At step 224 the control circuitry determines whether the second portion of the structure is still required. If so then data continues to be accessed in the second portion for a time. Once the second portion 102 of the storage structure is no longer required, it can be placed in a power saving state at step 226. In parallel with steps 224 and 226, instructions may start to be processed in the little processing mode using the entries in the first portion 100 of the storage structure, so that steps 224 and 226 run in the background and do not delay the start of processing in the little processing mode.

The tracking of whether the second portion 102 of the storage structure is still required at step 224 may be performed in different ways for different kinds of storage structure. For some structures such as the decode queue 26, issue queue 36 or the load store queue 40 or the reorder buffer 64, entries of the structure may be invalidated when the corresponding instructions are issued, completed or retired. For example when an instruction is issued to the execute stage 14, its corresponding entry in the issue queue 36 may be invalidated. When a load store instruction completes, its entry in the load/store unit 40 may be invalidated. When an instruction retires because it and any earlier instructions have completed, its reorder buffer entry can be invalidated. Hence, for such structures step 224 may simply monitor whether an entry has become invalid and then determine that it is no longer required. Some systems may support individualised powering down of different entries while other entries in the second portion are still required, so that an entry can be powered down as soon as it becomes invalid. Other systems may only support switching all the entries of the second subset to the power saving state together, so may wait until each of the entries in the second subset is no longer required before entering the power saving state.

For other storage structures such as the physical register file 30 the tracking of which entries are still required may be more complex. For example this may require tracking of pending instructions in the issue queue 12, execute stage 14 or write back stage 16 that still require reads or writes to a given physical register 30. However, often for the purposes of register renaming at the rename stage 10, there may already be provided some logic for tracking the outstanding reads and writes in order to determine when a physical register 30 allocated to one architectural register specifier can be reclaimed for mapping to a different architectural register specifier at the rename stage 10. Therefore some of this logic could be reused for the purposes of determining when the second portion 102 of the physical register 30 can be powered down.

Figure 8:
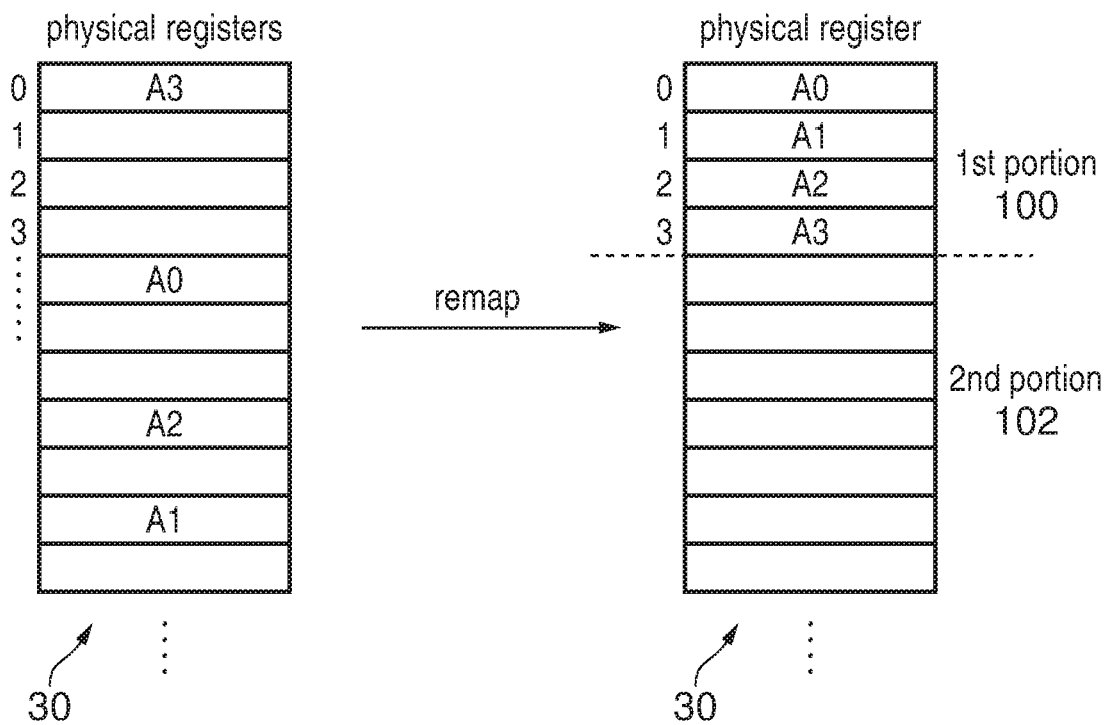
FIG. 8 shows an example of remapping architectural registers to physical registers when a portion of the physical register file is placed in a power saving state.

However, even if there are no pending instructions which still need to read a given physical register, at the point of switching to the little processing mode the current architectural stage may be distributed throughout the register file 30 rather than being in a contiguous block. For example as shown in FIG. 8, the physical registers which are currently mapped to corresponding architectural registers may not be adjacent to each other in the physical register file. This can make it more difficult to power down a subset of the registers since providing individualised control of the power state of each register depending on the current contents of the register rename table 32 may be more expensive in terms of circuit area and leakage.

Therefore, as shown in FIG. 8, on switching from the big processing mode to the little processing mode, the rename stage 10 may walk through the rename table 32 to remap each architectural register specifier to a predetermined physical register so that there is now a fixed one-to-one mapping between the architectural registers and corresponding physical registers. FIG. 8 shows a simple example with 4 architectural register specifiers but it will be appreciated that in practice there may be more than 4. In this example the architectural register specifiers A0, A1, A2, A3 are mapped to corresponding target physical registers 0,1,2,3 respectively. On switching modes, one of the target physical registers may already be allocated to a different architectural register specifier, so there may need to be a series of remapping operations to result in the fixed one-to-one-mapping (including potentially remapping some architectural registers to physical registers in the second portion 102 of the register file temporarily while swapping the register mappings). An example of this process will be described with respect to FIG. 10 below. Having remapped each architectural register specifier to a predetermined physical register then not only the second portion 102 of unused physical registers, but also the rename table 32 itself may be powered down so that the little processing mode can be more energy efficient.

In other examples, it may not be necessary to map the architectural register specifiers to a predetermined mapping, but the architectural register specifiers could simply be mapped to any registers within the first portion 100 which remain powered during the little processing mode. For example in the case of FIG. 8 architectural register specifier A3 was initially mapped to physical register 0 within the first portion 100 and so this could have retained the same register mapping with the other architectural register specifiers A0, A2, A1 being remapped to physical registers 1, 2, 3 for example. This approach may be more efficient in cases where the rename table 32 will still be required during the little processing mode because it can reduce the number of remapping operations required. For example if the little processing mode supports some out-of-order execution with renaming but with less energy overhead than the big processing mode, then the rename table 32 may still be required anyway and so it may be preferable to reduce the number of changes to the rename table required on switching modes. However, if the little processing mode does not use register renaming then it can be more efficient to map the architectural registers to a certain fixed set of physical registers as described above, so that the rename table 32 can be powered down as well.

The remapping of architectural to physical registers on switching processing modes can be performed in different ways. In some cases, following the switch there may be an instruction encountered which specifies a given architectural register specifier which is to be remapped to an alternate register in the first portion 100, and so in response to this instruction the rename stage 10 may generate the new mapping for that architectural specifier. However, if there are no instructions which specify a given architectural specifier then an additional instruction could be injected into the pipeline 4 to trigger the pipeline to move a data value from a physical register within the second portion 102 to a physical register within the first portion 100 so that no architectural state is lost.

Figure 9:
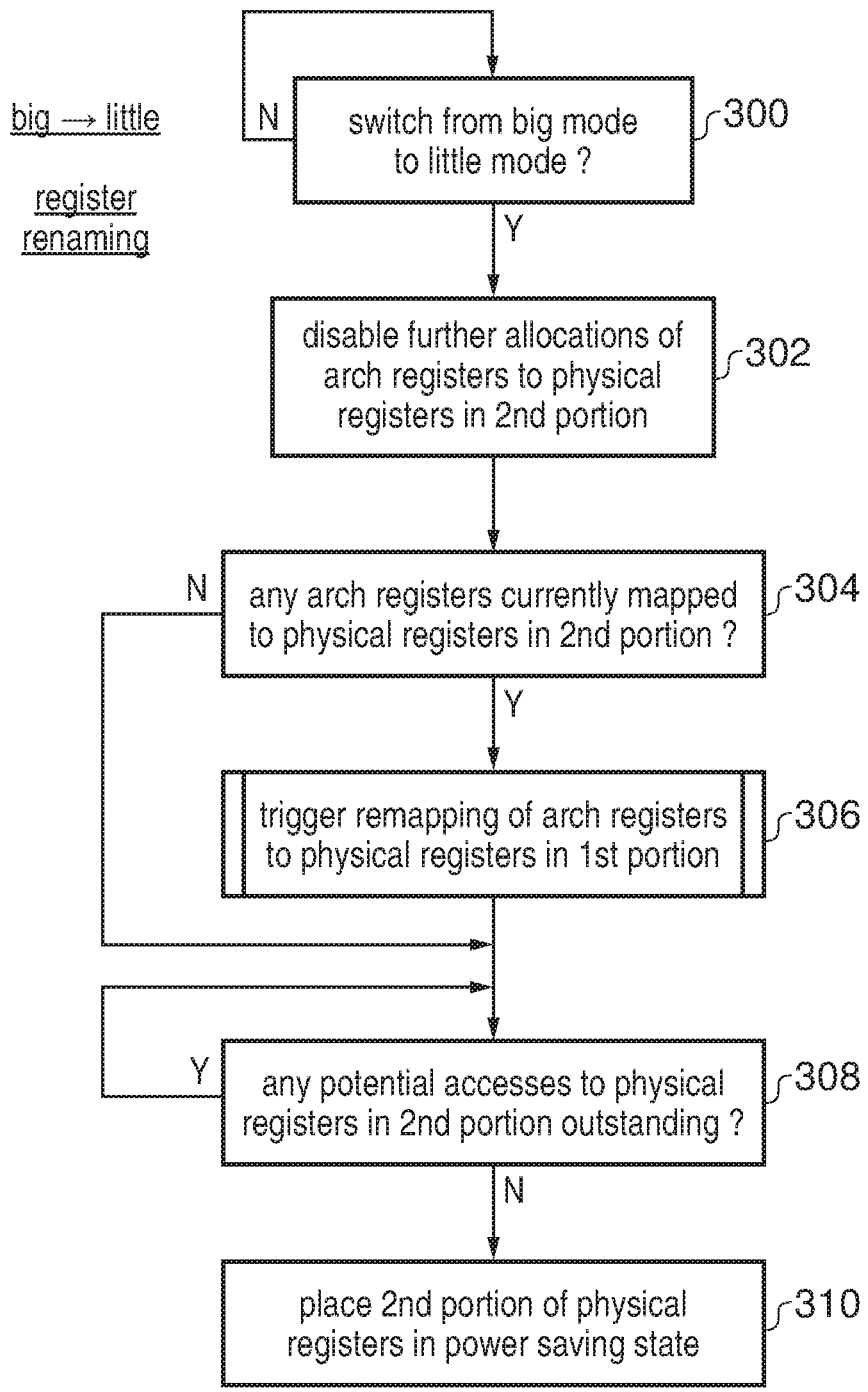
FIG. 9 shows method of remapping the architectural to physical register mappings on a transition from the first processing mode to the second processing mode.

FIG. 9 shows a method of transitioning from the big processing mode to the little processing mode in the case where register renaming is supported. At step 300 the mode control circuitry 70 determines whether the switch from big to little mode is required. If so then at step 302 the mode control circuitry 70 controls the register rename stage 10 to prevent further allocations of architectural registers to physical registers within the second portion 102 of the register file 30. At step 304 the rename stage determines whether there are any architectural registers currently mapped to physical registers in the second portion 102. If so, then at step 306 a remapping of the rename table 32 is triggered so that each architectural register is now mapped to a physical register in the first portion 100 of the register file. Step 306 can be omitted if there are no architectural registers currently mapped to physical registers in the second portion 102, or alternatively some remapping at step 306 could still be performed even if all the architectural registers are currently mapped to the first portion 100 in order to reach a fixed mapping to permit powering down of the rename table as discussed above. An example process for carrying out the remapping of step 306 is described in more detail below with respect to FIG. 10.

The remapping at step 306 may take some time and take place in parallel with other steps of FIG. 9. For example it may take some time for a register move instruction injected in order to move a data value from a register in the second portion 102 to an alternate register in the first portion 100 to propagate through the pipeline and complete the remapping of the architectural register to an alternate physical register.

Meanwhile at step 308 the mode control circuitry 70 determines whether there are any potential accesses to physical registers in the second portion 102 outstanding. For example, this may be determined using register reclaim logic provided in the rename circuitry 10 to determine when an already allocated physical register can be reclaimed for remapping to a different architectural register. If there is the potential for an access to be outstanding then the second portion of the register file is not yet powered down. The estimate of whether there are any potential accesses in the second portion outstanding could be a conservative estimate and may not track whether there are actual accesses outstanding to particular registers. For example it could just be an indication of whether there is any instruction outstanding which was older than the point at which the physical registers in the second portion were remapped. Once there are no potential accesses to physical registers in the second portion 102 outstanding, at step 310 the second portion 102 of the register file 30 is placed in the power saving state.

Figure 10:
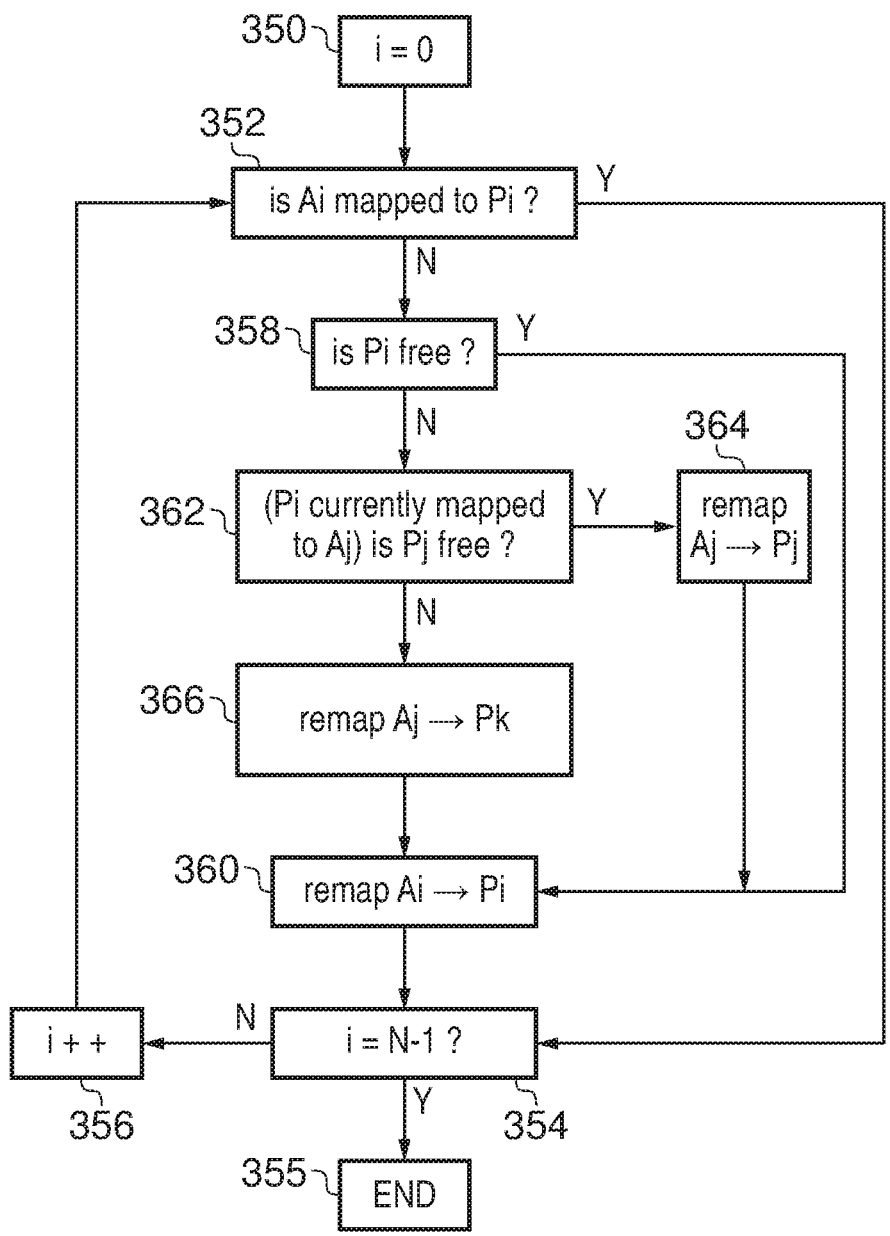
FIG. 10 shows an example process for remapping each architectural register specifier to a target physical register on a transition from the first processing mode to the second processing mode.

FIG. 10 shows an example of the remapping step 306 of FIG. 9 in more detail. In FIG. 10, the notation Ai refers to a particular architectural register specifier (where there are N architectural register specifiers in total, and 0≤i<N). In this example, each architectural register specifier Ai is remapped to a predetermined target physical register Pi on switching to the little processing mode. The notation Pi, Pj represents the target physical register corresponding to architectural register Ai, Aj respectively. While in many cases the target physical register Pi, Pj will be the register having a physical register specifier with the same numeric value as the corresponding architectural register specifier Ai, Aj (e.g. physical register 1 can be the target register for architectural register specifier A1), this is not essential. In other examples, there could be a more arbitrary mapping with architectural register Ai having corresponding a target physical register Pi with a different numeric value of the register specifier.

At step 350 i starts at 0. At step 352 the rename stage 10 determines whether architectural register specifier Ai is already mapped to its target physical register Pi. If so, then no remapping is required for this architectural register specifier, and the method proceeds to step 354 where it is determined whether i is equal to N−1. If i=N−1, then all the architectural register specifiers are now mapped to their target physical registers according to a predetermined one-to-one mapping, and so at step 355 the remapping process ends. If i does not equal N−1, then at step 356 i is incremented, and the method returns to step 352 to consider the next architectural register specifier Ai.

If at step 352 Ai is not already mapped to its target physical register Pi, then at step 358 it is determined whether the target physical register Pi is free (i.e. physical register Pi is not already allocated to an architectural register specifier in the rename table 32). If so, then at step 360 the rename stage 10 triggers remapping of architectural register specifier Ai to physical register specifier Pi. The method then proceeds to step 354 to check whether there are any more architectural register specifiers to be remapped, as discussed above.

On the other hand, if at step 358 the corresponding physical register Pi is currently allocated to another architectural register specifier Aj, then before remapping architectural register specifier Ai, the rename stage 10 remaps the other architectural register specifier Aj to a different physical register so that physical register Pi can be freed for renaming. At step 362, the rename stage determines whether the target physical register Pj corresponding to architectural register specifier Aj is free, and if so, then at step 364 architectural register specifier Aj is remapped to its target physical register Pj (it is preferable to remap Aj to Pj if possible since this will save a remapping step in a subsequent iteration of the method shown in FIG. 10). However, if Pj is not free as it is currently mapped to another architectural register specifier, then at step 366 architectural register specifier Aj is remapped to a physical register Pk which is not the target physical register for any of the architectural register specifiers (i.e. Pk is a physical register in the second portion 102 of the register file). Following either step 364 or step 366, physical register Pi is now free, and so the method then proceeds to step 360 to remap architectural register specifier Ai to its target physical register Pi. Again, the method continues to step 354 to check whether there are any more architectural registers to be remapped, and eventually once all the architectural registers have been remapped to their target physical registers, the remapping ends at step 355.

The remapping at any of steps 360, 364, 366 can be performed either by waiting for an instruction which writes to the remapped architectural register specifier Ai, Aj as a destination register, or by injecting an additional instruction into the pipeline to move the value associated with that architectural register specifier from a previous physical register to the new physical register Pi, Pj, Pk, and with either of these techniques the rename table 32 is updated to reflect the new mapping. Also, the remapping steps 360, 364, 366 may have to wait for outstanding reads or writes to the physical registers Pi, Pj, Pk to finish before carrying out the remapping, to avoid potential read-after-write or write-after-write hazard (as mentioned above, register reclaim logic may already be provided in the rename stage 10 for tracking when physical registers are no longer required for any pending instruction). Therefore, it may take some time for each of the architectural register specifiers to be remapped to the respective target physical registers. In the meantime, processing can continue in the little processing mode while register renaming continues in the background, until all the architectural register specifiers are all mapped to their corresponding target physical registers and the second portion 102 of the register file and rename table 32 can then be powered down.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. An apparatus comprising:
   a processing pipeline to process instructions, the processing pipeline having at least a first processing mode and a second processing mode with different performance or energy consumption characteristics;
   a shared translation lookaside buffer or shared branch prediction table, wherein the shared translation lookaside buffer or the shared branch prediction table comprises a plurality of entries and is accessible to the processing pipeline in both the first processing mode and the second processing mode;
   control circuitry to select one of the first processing mode and the second processing mode of the processing pipeline, and to trigger a subset of the entries of the shared translation lookaside buffer or the shared branch prediction table to be placed in a power saving state when the second processing mode is selected;

a plurality of physical registers to store data values accessible to the processing pipeline in response to instructions; and register renaming circuitry to map architectural register specifiers specified by instructions to corresponding physical registers at least in the first processing mode, wherein the control circuitry is configured to trigger a subset of the physical registers to be placed in a power saving state when the second processing mode is selected, and wherein at least one of:
   on switching the processing pipeline from the first processing mode to the second processing mode, the register renaming circuitry is configured to disable further allocation of the subset of the physical registers to architectural register specifiers; and
   on switching the processing pipeline from the first processing mode to the second processing mode, the register renaming circuitry is configured to remap one or more architectural register specifiers currently mapped to said subset of physical registers to alternate physical registers other than said subset of physical registers.

2. The apparatus according to claim 1, wherein the processing pipeline comprises a plurality of execution circuits available for executing the same set of instructions, and the first processing mode and the second processing mode use different execution circuits for executing instructions, where said different execution circuits comprise circuits other than registers.

3. The apparatus according to claim 1, wherein a number of said plurality of entries accessible to the processing pipeline in the second processing mode is less than a number of said plurality of entries accessible to the processing pipeline in the first processing mode.

4. The apparatus according to claim 1, wherein a number of said plurality of entries placed in the power saving state is greater in the second processing mode than in the first processing mode.

5. The apparatus according to claim 1, in which a number of said physical registers accessible to the processing pipeline in the second processing mode is less than a number of said physical registers accessible to the processing pipeline in the first processing mode.

6. The apparatus according to claim 1, wherein when the register renaming circuitry is configured to remap one or more architectural register specifiers currently mapped to said subset of physical registers to alternate physical registers other than said subset of physical registers, the register renaming circuitry is configured to remap a given architectural register specifier currently mapped to one of said subset of physical registers to an alternate physical register in response to an instruction to be processed by the processing pipeline which specifies the given architectural register specifier as a destination register.

7. The apparatus according to any claim 1, wherein when the register renaming circuitry is configured to remap one or more architectural register specifiers currently mapped to said subset of physical registers to alternate physical registers other than said subset of physical registers, the register renaming circuitry is configured to remap a given architectural register specifier currently mapped to one of said subset of physical registers to an alternate physical register, and to trigger an additional instruction to be processed by the processing pipeline to control the processing pipeline to move a data value from one of said subset of the physical registers to said alternate physical register.

8. The apparatus according to claim 1, comprising a rename table to identify current mappings between architectural register specifiers and physical registers,
   wherein on switching the processing pipeline from the first processing mode to the second processing mode, the register rename circuitry is configured to remap each architectural register specifier to a predetermined physical register such that there is a fixed one-to-one mapping between the architectural registers and corresponding physical registers, and the control circuitry is configured to trigger the rename table and the subset of physical registers to be placed in a power saving state.

9. The apparatus according to claim 1, wherein in the first processing mode, the processing pipeline has a greater maximum throughput of instructions than in the second processing mode.

10. An apparatus comprising:
   a processing pipeline to process instructions, the processing pipeline having at least a first processing mode and a second processing mode with different performance or energy consumption characteristics;
   a shared translation lookaside buffer or shared branch prediction table, wherein the shared translation lookaside buffer or the shared branch prediction table comprises a plurality of entries and is accessible to the processing pipeline in both the first processing mode and the second processing mode;
   control circuitry to select one of the first processing mode and the second processing mode of the processing pipeline, and to trigger a subset of the entries of the shared translation lookaside buffer or the shared branch prediction table to be placed in a power saving state when the second processing mode is selected,
   wherein on switching the processing pipeline from the first processing mode to the second processing mode, the control circuitry is configured to disable further allocation of information to said subset of entries; and
   wherein the control circuitry is configured to allow the processing pipeline to continue to access information within at least some of said subset of entries for a period after disabling said further allocation of information to said subset of entries.

11. The apparatus according to claim 10, wherein the control circuitry is configured to trigger one of said subset of entries to be placed in the power saving state in response to an indication that the processing pipeline no longer requires said one of said subset of entries.

12. The apparatus according to claim 10, wherein the processing pipeline is configured to process instructions in the second processing mode during said period when the processing pipeline is allowed to continue to access information in said subset of entries.

13. The apparatus according to claim 1, wherein on switching the processing pipeline from the second processing mode to the first processing mode, the control circuitry is configured to enable further allocation of information to said subset of entries.

14. A method comprising:
   selecting one of at least a first processing mode and a second processing mode of a processing pipeline for processing instructions, the first processing mode and the second processing mode having different performance or energy consumption characteristics, the processing pipeline having access to a shared translation lookaside buffer or a shared branch prediction table in both the first processing mode and the second processing mode, the shared translation lookaside buffer or the shared branch prediction table having a plurality of entries; and when the second processing mode is selected, placing a subset of the entries of the shared translation lookaside buffer or the shared branch prediction table in a power saving state;

storing data values accessible to the processing pipeline in a plurality of physical registers in response to instructions;

mapping architectural register specifiers specified by instructions to corresponding physical registers at least in the first processing mode;

when the second processing mode is selected, triggering a subset of the physical registers to be placed in a power saving state; and at least one of:
- on switching the processing pipeline from the first processing mode to the second processing mode, disabling further allocation on the subset of the physical registers to architectural register specifiers; and
- on switching the processing pipeline from the first processing mode to the second processing mode, remapping one or more architectural registers specifiers currently mapped to said subset of physical registers to alternate physical registers other than said subset of physical registers.

* * * * *